United States Patent [19]
Wagner

[11] 3,748,775
[45] July 31, 1973

[54] TROLLING BOARD
[76] Inventor: Arthur E. Wagner, 400 S. Plumas, Willows, Calif. 95988
[22] Filed: May 12, 1971
[21] Appl. No.: 142,552

[52] U.S. Cl. .............................................. 43/43.13
[51] Int. Cl. ...................... A01k 91/00, A01k 93/00
[58] Field of Search ...................... 43/43.13, 42.47, 43/42.45, 42.11; 46/93

[56] References Cited
UNITED STATES PATENTS

| | | | |
|---|---|---|---|
| 2,597,288 | 5/1952 | Caldwell | 43/43.13 |
| 2,582,754 | 1/1952 | Kahler | 43/43.13 |
| 3,271,892 | 9/1966 | Sabrsula | 43/43.13 X |
| 2,572,427 | 10/1951 | Anglim | 43/43.13 |
| 1,361,602 | 12/1920 | Marks | 43/43.13 |
| 3,410,014 | 11/1968 | Jenssen | 43/43.13 X |
| 2,249,382 | 7/1941 | Henriksen | 43/43.13 |
| 1,606,240 | 11/1926 | Klaserner | 43/43.13 |

Primary Examiner—Russell R. Kinsey
Assistant Examiner—James H. Czerwonky
Attorney—Ernest L. Brown

[57] ABSTRACT

A substantially rectangular board, having a rudder postioned diagonally across the bottom, adapted to float in a moving water current and attached to the shore or a boat, whereby the relatively moving current striking the diagonally positioned rudder forces the board away from the shore or boat and into the stream, while the restraining line prevents the board from floating away. The downwardly extending rudder is substantially rectangular, except for its upper edge being inclined downwardly toward the center of the rudder from both of its upper ends. The board is clamped to the upper edge of the rudder, causing the board to assume an arc substatnially conforming to the configuration of the inclined area of the rudder. An upstanding post positioned on the board is adapted to snag a trolling line, the trolling line extending from the bank or boat around the post and downstream from the board, the post preferably being slightly canted in a downstream direction, whereby a lure is trolled downstream from the board and a fisherman on the bank may disengage the fishing line from the canted upstanding post by a flick of the wrist when a fish is on the lure.

10 Claims, 4 Drawing Figures

PATENTED JUL 31 1973 3,748,775

INVENTOR
ARTHUR E. WAGNER
BY
Ernest L. Brown
ATTORNEY

TROLLING BOARD

BACKGROUND OF THE INVENTION

The state of the art will be described in connection with three United States patents.

U.S. Pat. No. 78,029 issued Jan. 17, 1905, to M. Flegle for a "Trolling Float." The apparatus of the U.S. Pat. No. 78,029 is a float body having a cross-section which is an isosceles triangle with a rather small apex angle pointing downward into the water and a fin further projecting from the triangle downward into the water to stabilize the hollow triangular-shaped member. The float is pulled from one side by a restraining line and the trolling or fishing line is permanently attached to the float.

U.S. Pat. No. 1,081,837 issued Dec. 16, 1913, to T. W. Jordan for a "Trolling Device." The apparatus of the U.S. Pat. No. 1,081,837 is a block of wood having one edge thereof weighted with lead so that the weighted side is the downward side in the water, and the block floats partly submerged. The front and back ends of the piece of wood are tapered and beveled to reduce the resistance to the flow of water. The tow line is attached to two eyes, positioned on one face of the block of wood near the front and rear edges. The angle of attachment of the drag line is adjusted by positioning a hook into one of a plurality of eyes positioned on the face of the block of wood.

U.S. Pat. No. 2,798,331 issued July 9, 1957, to S. A. Westdahl for a "Trolling Float." The apparatus of U.S. Pat. No. 2,798,331 uses an elongated body having two sections. The forward section carries a deep keel and the rear section has a bobber. The forward section extends about two-thirds of the length of the device and has a center of gravity between one-fifth and one-fourth of the height of the forward section and not more than one-third of the distance from the front end of the body. The forward section tapers transversely of its longitudinal axis and is weighted at its narrower portion. The bobber is wider at its mid-portion than the mid-portion of the forward section and has less height than the forward section. The body further has an outrigger mounted thereon which is movable with respect to the body to engage a line on either side of the body and has means for slidably receiving a line and a spring clip mounted on the top of the body adjacent the outrigger. The spring clip and outrigger engage the line attached to the float, with the spring clip frictionally engaging the line to automatically release the line when a predetermined force is applied thereto.

BRIEF DESCRIPTION OF THE INVENTION

The apparatus of this invention has a substantially rectangular elongated floating member, preferably made of wood. The rectangular floating member is adapted to float in the water with its longest dimension pointing substantially in the direction of the relative water current and its smallest dimension substantially vertical. One end of the floating member, designated the forward end, is tapered to reduce turbulence and resist bobbing of the member. Substantially in the center of the large faces of the floating member is formed a hole with a pin therein downwardly extending into the water. Attached to the bottom of the downwardly extending pin is a substantially symmetrical rudder. The rudder is substantially rectangular except that the top edge is inclined downwardly from both ends toward the center, and the ends are beveled to a sharp edge to minimize turbulence. On each side of the forward end of the float a plurality of holes are formed, into which a mooring line may be attached. Aft of the center pin is an upstanding pin which is canted slightly in an aft direction. A trolling line may be snubbed on the canted pin and played off of the aft end of the float. When a fish is caught, the fisherman on the shore or in a boat with a twist of his wrist releases the trolling line from the canted pin and plays in the fish.

It is therefore an object of this invention to provide a new and novel troling board or float which maintains its position in a moving current relative to the shore or a boat.

It is a more specific object of this invention to provide a trolling float which is adapted to snub a trolling line and to play the trolling line off of the aft end of the float.

BRIEF DESCRIPTION OF THE DRAWINGS

Other objects will become apparent from the following description, taken in connection with the accompanying drawings, in which.

DETAILED DESCRIPTION OF THE INVENTION

Figure 1:
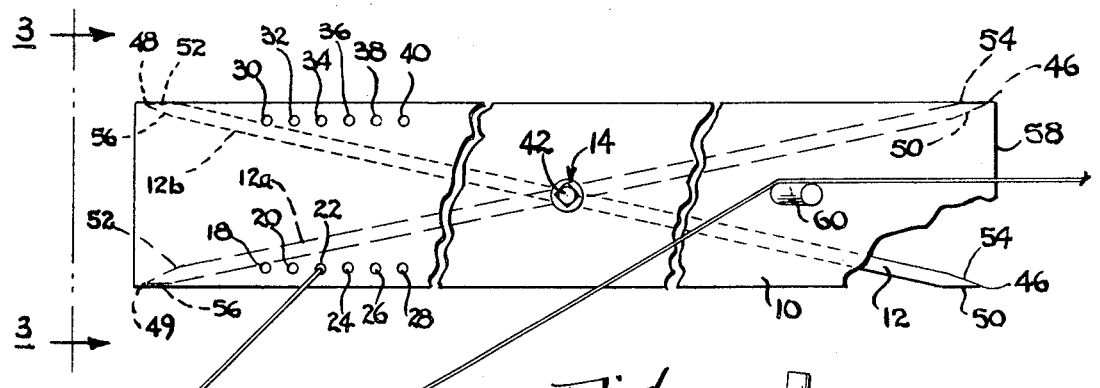
FIG. 1 is a top plan view of the trolling float of this invention.

All parts of the appartus of the invention, except the mooring and trolling lines 16 and 62, the lure 64, the weight 66 and the pivot 14, are preferably fabricated of wood, although it is not essential that they be so fabricated. For example, they may be made of any other material that floats, such as foam plastic, or even metal which has been hollowed out to decrease its density.

The two major structural members of the apparatus of this invention are the float 10 and the rudder 12 which is pivoted to the float 10 at the center thereof by a pivot member 14.

The rudder 12 is adapted to be turned relative to the float 10 about the axis of the pivot 14. The two extreme positions for the rudder are shown in dashed lines at 12A and 12B in FIG. 1. With the mooring line 16 to the shore positioned in any of the holes 18, 20, 22, 24, 26 or 28, the rudder 14 would be on the side of the center line of the float indicated by 12B. The rudder 12 need not be in its extreme position, depending upon where the fisherman wants the trolling board, the speed of the current, and the like. When one speaks of the speed of the current, one means the relative speed of the water from left to right in FIG. 1, relative to the float 10. That speed can be generated by the motion of a boat pulling on the mooring lines 16. It is therefore apparent that the mooring lines 16 may be attached to the shore, or may be attached to a boat. When the mooring line 16 is attached to holes 30, 32, 34, 36, 38 or 40, the rudder 12 is on the side of the centerline indicated by 12A. Again, the rudder need not be in its extreme position. Further, the use of six holes on each side is merely exemplary. More or fewer holes may actually be used. The invention is not to be limited to the use of holes for attaching the mooring line 16. Any other means such as a clamp, post, and the like, may be used. Holes are shown for example only.

Figure 2:
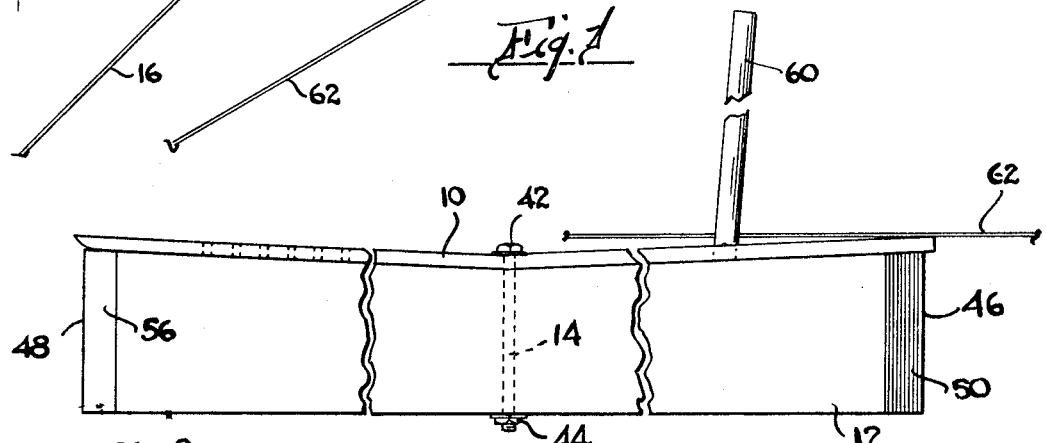
FIG. 2 is a side view of the float of this invention.
Figure 4:
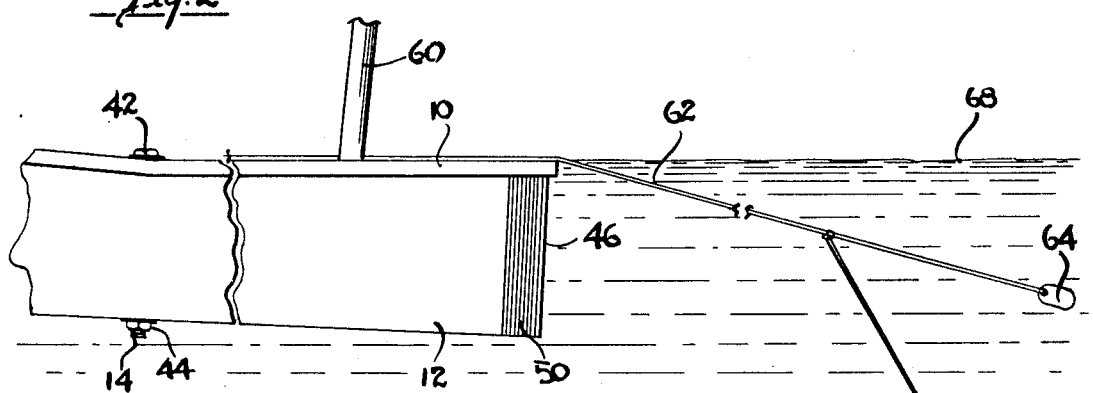
FIG. 4 is a partial side view of the float of this invention floating in the water and showing the lure and weight of a trolling line.
Figure 3:
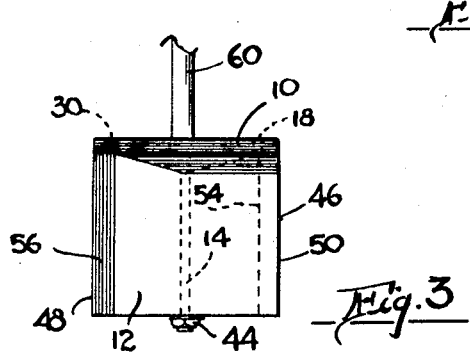
FIG. 3 is an end view, taken at —3 in FIG. 1.

A clamping means 42 and 44, which may be a machine nut over a washer as shown in FIGS. 1, 2 and 4 at 42, and the head of a bolt as shown at 44, are provided to clamp the float 10 and the keel 12 together. Other clamping means may be used if desired; a bolt for the pivot 14 with the head at 44, and a nut and washer at 42, are merely convenient. When the clamp at 42 and 44 is tightened to hold the rudder 12 in position relative to the float 10, the float 10, in a preferred embodiment, is caused to bend or bow to fit the tapered upper contour of the keel 12.

The rudder 12 is a substantially rectangular rudder which has its upper side modified to incline downwardly toward the center. For example, if the float 10 is six feet long, the depth of the rudder at the ends might be four and one-half inches, while the depth of the keel in the vicinity of the pin 14 might be four inches, thereby giving a one-half inch taper in three feet of length, or a taper of one part in seventy two. At the ends of the rudder 12, the rudder is beveled to sharp edges 46 and 48. The faces thereby formed, such as the face 50 and the face 52, in the extreme position 12B, shown in FIG. 1, align themselves with the edge of the float 10. When the rudder 12 is in its other extreme position 12A, the faces 54 and 56 align themselves with the edge of the float 10.

Approximately one-half of the distance between the pivot 14 and the after end 58 of the float 10 is an upstanding pin 60 having a slight cant, for example on the order of 5°, in an aft direction.

A trolling line 62 is shown snubbed over the pin 60 and extending aft, particularly as shown in FIG. 4, into the water. A lure 64 and a weight 66, partly submerged in the water 68, are shown as they would appear in use of the apparatus of this invention. When using the apparatus, the rudder 12 is adjusted in its position and the clamp members 42 and 44 are clamped down to hold the rudder in position. It might take several tries for a given relative stream current velocity to determine the proper setting for the rudder member 12. When the fisherman is, for example, standing on the shore, the mooring line is positioned into one of the holes such as holes 18, 20, 22, 24, 26, 28, 30, 32, 34, 36, 38 or 40, to get the float 10 into proper position. The trolling line 62 is snubbed over the canted pin 60. Due to the curvature of the float member 10, the float 10 tends to aquaplane into the current, thereby raising the forward end and lowering the aft end until the aft end is substantially down in the water. The planing of the forward end of the float 10 maintains the stability of the apparatus.

When the fisherman catches a fish on the lure 64, he merely tugs on the line 62, raising it up off of the canted pin 60 (which is canted to facilitate this maneuver), thereby disengaging the trolling line 62 from the trolling float 10. The fisherman then proceeds in the normal manner to play the fish and land it.

It must be stressed that although a pivot member 14 is shown and described, any other means such as, for example, a hinge, may be used.

It is also within the scope of this invention to affix the rudder 12 to the float 10 in some diagonal position as shown. Although such an apparatus would not operate as well as the adjustable device, it would operate under limited conditions.

It is also to be noted that although the top of the rudder 12 is shown with a straight incline toward the center thereof, the top may actually be curved with the depth of the keel less in the center than it is on the ends.

Referring again to the canted post 60, it must be stressed that although a post is preferred, any other releasable snubbing apparatus may be used to snub the trolling line 62.

Thus, the apparatus of this invention is a relatively simple, stable, and adjustable trolling float which allows the trolling line to be played into the stream while the fisherman stays to one side, either on the bank or in a boat.

Although the invention has been described in detail above, it is not intended that the invention should be limited by that description, but only by that description in combination with the appended claims.

What is claimed is:

1. In combination:
a substantially rectangular float member;
a rudder member, attached to and extending downwardly from said float member and positioned and extending from one edge to the other of said float member,
said rudder member being substantially rectangular and having its upper edge inclined downwardly toward the center of the rudder from both of its ends;
the ends of said rudder being beveled, across the thickness thereof, to conform substantially to the side edges of said float; and
means for clamping said rudder to said float member in tight conformity to cause said float member to assume an arc substantially conforming to said downward inclination of the upper edge of said rudder member.

2. Apparatus as recited in claim 1 and further comprising snubbing means on the aft end of said float member for snubbing a trolling line.

3. Apparatus as recited in claim 2 in which said snubbing means comprises an upstanding member.

4. Apparatus as recited in claim 3 in which said upstanding member is canted from said float in an aft direction.

5. Apparatus as recited in claim 2 and further comprising a trolling line, snubbing said snubbing means, and having fishing apparatus on one end thereof.

6. Apparatus as recited in claim 1 in which said rudder member is adjustable in position between the two diagonals of said float member.

7. Apparatus as recited in claim 1 in which said rudder member is rotatably attached to said float member by a pivot which is downwardly depending therefrom and which extends into said rudder member at substantially the center thereof.

8. Apparatus as recited in claim 7 in which said pivot member extends through said rudder member and substantially the center of said float member, and further comprising clamping means on the ends of said pivot to hold said rudder member in position substantially along the length of one of the diagonals of said float member and to cause said float to be contoured into an arc forming with the upper contour of said rudder member.

9. Apparatus as recited in claim 8 in which said float is further curved across the thickness of its forward end to minimize water turbulence.

10. Apparatus as recited in claim 1 and further comprising a mooring line attached to one side of the forward end of said float member.

* * * * *